(No Model.)

H. KILLAM.
CARRIAGE POLE FASTENING.

No. 455,946. Patented July 14, 1891.

Witnesses  Henry Killam, Inventor

UNITED STATES PATENT OFFICE.

HENRY KILLAM, OF NEW HAVEN, CONNECTICUT.

CARRIAGE-POLE FASTENING.

SPECIFICATION forming part of Letters Patent No. 455,946, dated July 14, 1891.

Application filed April 20, 1891. Serial No. 389,651. (No model.)

*To all whom it may concern:*

Be it known that I, HENRY KILLAM, of New Haven, in the county of New Haven and State of Connecticut, have invented a new Improvement in Attaching Carriage-Poles; and I do hereby declare the following, when taken in connection with accompanying drawings and the letters of reference marked thereon, to be a full, clear, and exact description of the same, and which said drawings constitute part of this specification, and represent, in—

Figure 1:
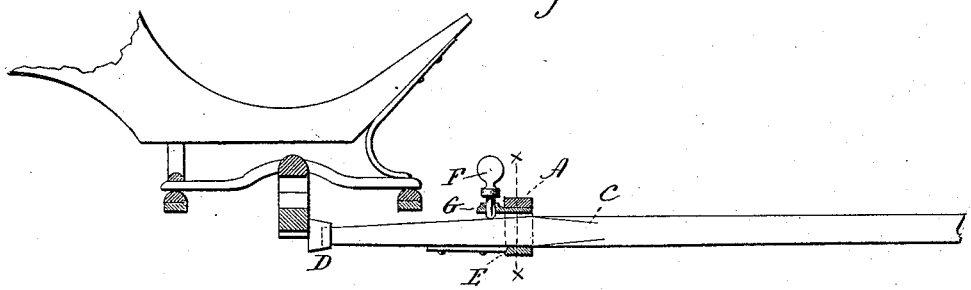
Figure 2:
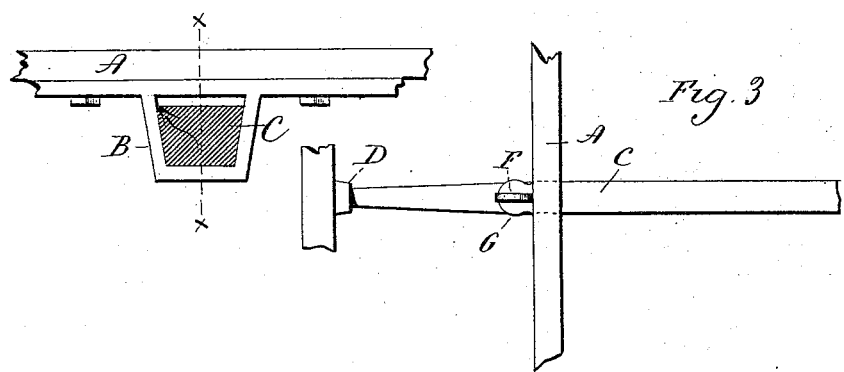
Figure 3:
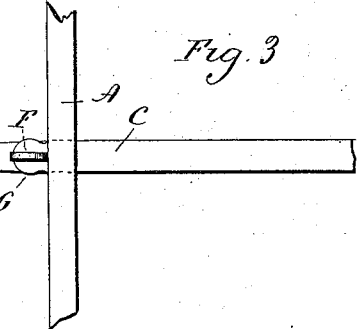

Figure 1, a longitudinal section through so much of the running-gear of a carriage as necessary for the illustration of the invention, the pole being in side view; Fig. 2, a transverse section on line $x\,x$ of Fig. 1, enlarged; Fig. 3, a top view of the parts illustrated in Fig. 1; and Fig. 4, a longitudinal section cutting on line $x\,x$ of Fig. 2, on the same scale as Fig. 2.

This invention relates to an improvement in attaching that class of carriage-poles to the running-gear of carriages in which the carriage-pole is made removable, the object being a simple construction, whereby the pole may be readily introduced or removed, and yet firmly held when in place; and the invention consists in a loop arranged upon the cross-bar adapted for the passage of the rear end of the pole through it, with a socket at the rear into which the rear end of the pole may set, the pole provided with a shoulder adapted to drop in rear of and so as to engage with said loop, combined with a set-screw adapted to clamp the pole in the loop, as more fully hereinafter described.

A represents the cross-bar of a carriage of usual construction. Upon the under side of the cross-bar a loop B is applied, open fore and aft, and preferably tapers in width toward the bottom of the loop, the depth of the loop being somewhat greater than the thickness of the pole C. In rear of the cross-bar or loop a socket D is applied, adapted to receive the rear end of the pole when in place. The pole, at the point where it is to rest in the loop, is constructed of a shape corresponding to the loop, as seen in Fig. 2—that is to say, it tapers in width from top to bottom corresponding to the taper of the loop, but so that as it approaches the bottom of the loop the sides of the pole will be sure to come to a bearing on the corresponding sides of the loop, and so that the pole may wedge into the loop to hold it firmly and prevent it from rattling.

Figure 4:
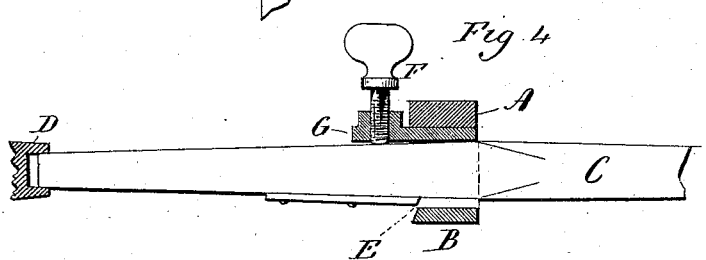

To secure the pole against being drawn outward, a shoulder E is formed upon the pole, preferably by securing a metal plate thereto, which is adapted to drop in rear of the loop after the pole is introduced, and so as to come to a bearing against the loop, as seen in Fig. 1. The rear side of the loop and the corresponding surface of the shoulder are preferably inclined downward and backward, as seen in Fig. 4, so that there may be a wedging action between the shoulder E and the rear side of the loop B, tending to force the pole rearward. Above the pole at the cross-bar a set-screw F is introduced, the loop being preferably constructed with a projection G, through which the set-screw may be inserted, as seen in Fig. 4. This set-screw is adapted to bear upon the top of the pole, and so that after the pole has been inserted, as seen in Fig. 4, the screw may be turned inward, so as to force the pole downward in the loop, and so as to bring the shoulder E to a bearing against the rear side of the loop, thus wedging the pole into the loop, and also rearward into the socket, which will securely hold the pole to prevent its accidental withdrawal, and also to prevent its rattling.

While I prefer the tapering shape of the loop as a means to prevent the rattling of the pole, this shape is not essential, as the force of the screw may be sufficient to bind the pole in the loop.

I prefer to construct the shoulder E and the rear side of the loop beveled or inclined, as I have described, so as to produce the wedging operation; yet this bevel may be omitted, the shoulders being substantially square.

It will be understood that the depth of the loop is at least as much greater than the thickness of the body of the pole as the depth of the shoulder, so that the shoulder may readily pass through the loop as the pole is introduced.

What I claim as my invention, and desire to secure by Letters Patent, is—

1. In a carriage running-gear, the combination of the pole-loop B, arranged upon the cross-bar, a socket D in rear of said loop, the pole adapted to pass through said loop to bring its rear end into said socket, the pole substantially fitting the loop, and the pole constructed with a shoulder in rear of said loop, and a set-screw arranged to bear upon the said pole and clamp it in the loop, substantially as described.

2. In a carriage running-gear, a pole-loop B on the cross-bar, tapering in width vertically, a socket in rear of said loop, a pole constructed to pass through said loop so as to take its rear end into the said socket, the pole at the loop constructed in transverse section corresponding to the tapering shape of the loop, with a set-screw adapted to bear upon said pole and clamp it in the said loop, substantially as described.

3. In a carriage running gear, the loop B, arranged upon the cross-bar, a socket D in rear of said loop, a pole constructed to pass through said loop and so as to bring its rear end into said socket D, the pole constructed with a shoulder E in rear of said loop, the forward side of said shoulder and the corresponding surface of the loop inclined, so as to produce a wedge-like action between the shoulder and loop, with a set-screw opposite said shoulder adapted to bear upon the pole, and so as to force the shoulder to its bearing on the loop, substantially as described.

In testimony whereof I have signed this specification in the presence of two subscribing witnesses.

HENRY KILLAM.

Witnesses:
FRED. C. EARLE,
LILLIAN D. KELSEY.